Figure 1:
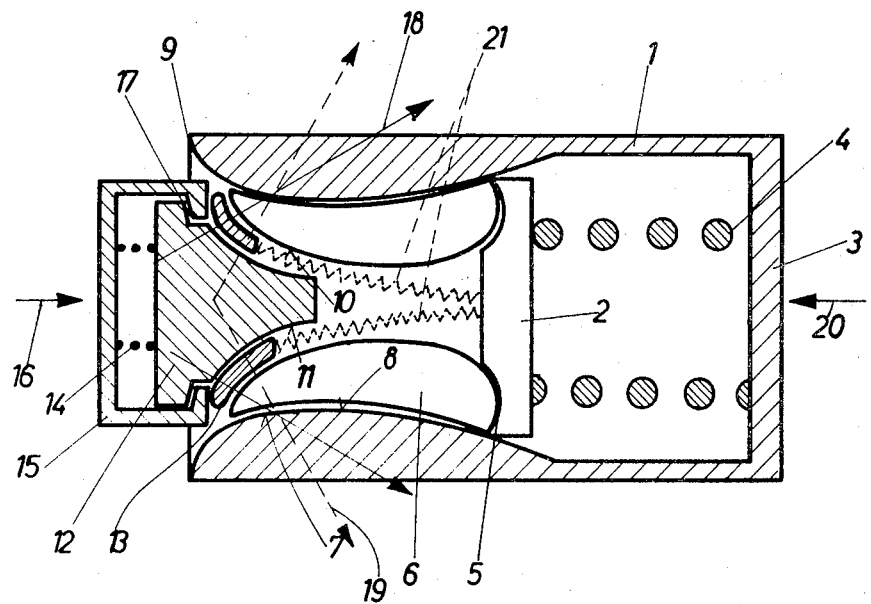

United States Patent [19]

Schelle

[11] 3,809,252

[45] May 7, 1974

[54] SPRING ELEMENT PARTICULARLY ADAPTED FOR AUTOMATIC CENTER HEAD COUPLERS OF RAILROAD VEHICLES

[75] Inventor: Axel Schelle, Rottach-Scherfen, Germany

[73] Assignee: Knorr-Bremse KG, Berlin and Munich, Germany

[22] Filed: Aug. 22, 1972

[21] Appl. No.: 282,668

[30] Foreign Application Priority Data
Aug. 31, 1971  Germany.......................... 2143565

[52] U.S. Cl................... 213/24, 213/20, 213/32
[51] Int. Cl. ..................... B61g 9/18, B61g 11/14
[58] Field of Search ............. 213/22, 24, 32, 36, 20

[56] References Cited
UNITED STATES PATENTS

| 1,673,507 | 6/1928 | Haseltine | 213/32 |
| 2,360,566 | 10/1944 | Kinne | 213/32 R |
| 2,692,057 | 10/1954 | Dentler | 213/22 |
| 3,468,432 | 9/1969 | Baillie | 213/22 |

*Primary Examiner*—Drayton E. Hoffman
*Attorney, Agent, or Firm*—Edmund M. Jaskiewicz

[57] ABSTRACT

A spring element has a thrust member insertable into a sleeve against spring and friction forces. The thrust member is coupled by force transmitting wedge means to a friction element which is carried along by insertion of the thrust member and moves against a friction surface on the inner face of the sleeve. The force transmitting wedge means comprises cooperating curved wedge surfaces extending in the direction of insertion and an intermediate element is disposed between the wedge surfaces. Regulator means are provided which are responsive to the magnitude of shock loads acting on the spring element to position the intermediate element with respect to the wedge surfaces.

6 Claims, 2 Drawing Figures

PATENTED MAY 7 1974 3,809,252

SPRING ELEMENT PARTICULARLY ADAPTED FOR AUTOMATIC CENTER HEAD COUPLERS OF RAILROAD VEHICLES

The present invention relates to spring elements such as employed in automatic center head couplers of railroad vehicles, more particularly, to such a spring element where the friction force which is to be overcome by the insertion of the thrust member varies as a function of the rate with which the load is applied to the spring element and the rate of increase of this load.

Spring elements have been constructed wherein a thrust member is insertable into a sleeve against spring and friction forces. The inner surface of the sleeve is provided with a friction surface upon which moves a friction element. This friction element is coupled to the thrust piece by a force transmitting wedge structure so that insertion of the thrust member into the sleeve carries along the friction element.

Such spring elements have the characteristic that the force transmitting wedge has a certain constant transmission ratio as a result of which the friction element is pressed against the friction surface of the sleeve with a force increasing in a linear relationship with respect to the load imposed upon the spring element. Consequently, the friction force which is to be overcome on insertion of the thrust member increases linearly with respect to the load on the spring element. Thus, every magnitude of load acting on the spring element corresponds with a predetermined friction force which is completely independent of the rate at which the load is applied to the spring element and at which this load is increased.

For many applications of such spring elements and particularly when employed as traction and thrust devices in automatic center head couplers of railroad vehicles it would be advantageous if the friction force which is to be overcome is relatively high in the case of rapidly applied or shock-type loads on the spring element and on the other hand this friction force is relatively low in the case of gradually increasing loads on the spring element. With presently known spring elements, this advantage could be obtained only by spring elements which employed a hydraulic fluid or an elastomer.

It is therefore the principal object of the present invention to provide a novel and improved spring element which is particularly adapted for automatic center head couplers of railroad vehicles.

It is another object of the present invention to provide such a spring element wherein the friction force to be overcome during the insertion of the thrust member varies as a function of the rate at which the load is applied and the increase of the load.

The objects of the present invention are achieved and the disadvantages of the prior art as described above are overcome by the spring element disclosed herein. According to one aspect of the present invention a spring element may comprise a sleeve having a friction surface on its inner face and a thrust member is insertable in an axial direction into the sleeve so as to act against spring and friction forces therein. Friction element means are provided within the sleeve so as to be movable upon the sleeve friction surface. Force transmitting wedge means couple the thrust member and the friction element means so that the friction element means is carried along by the thrust member upon its insertion into the sleeve. The force transmitting wedge means comprises cooperating curved wedge surfaces extending in the direction of insertion of the thrust member. An intermediate member is disposed between the wedge surfaces and has a length which is short with respect to the length of the wedge surfaces. There is also provided regulator means which is responsive to the magnitude of shock loads acting on the spring element to position the intermediate member with respect to the wedge surfaces.

The regulator means may comprise a displaceable regulator member which is supported by a spring in a direction parallel to the direction of the shock loads.

The wedge surfaces are provided with a convex curvature with respect to the friction element. The regulator means acts to position the intermediate element on a portion of the wedge surfaces which are steeply inclined with respect to the direction of insertion in the case of low shock loads and positions the intermediate element on a portion of the wedge surfaces which are slightly inclined in the case of high shock loads.

Figure 2:
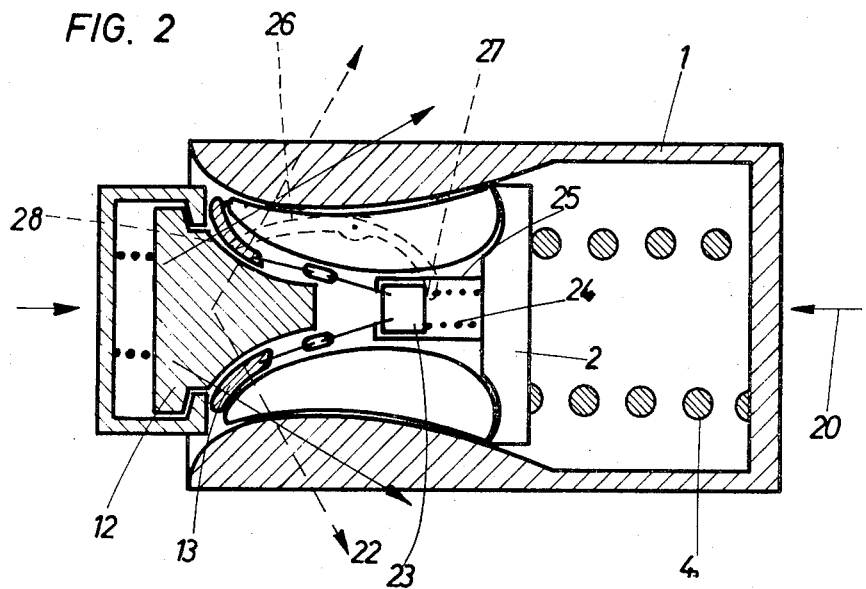

Other objects and advantages of the present invention will be apparent upon reference to the accompanying description when taken in conjunction with the following drawings, which are exemplary, wherein;

FIG. 1 is a longitudinal sectional view of one embodiment of a spring element according to the present invention; and FIG. 2 is a view similar to that of FIG. 1 of a further embodiment of a spring element.

Proceeding next to the drawings wherein like reference symbols indicate the same parts throughout the various views a specific embodiment and modifications of the present invention will be described in detail.

As may be seen in FIG. 1, the spring element according to the present invention comprises a substantially tubular sleeve 1 having a closed end or bottom wall 3 and a bearing plate 2 is displaceably positioned within the sleeve. A spring 14 is tensioned between the bearing plate 2 and the end wall 3. On the face of the plate away from the spring 4, there are provided two friction elements 6 whose ends bear against the plate 2 adjacent its outer edge at the bearing areas 5. Each of the friction elements 6 has a slightly concave curved pressure surface 7 which contacts a corresponding convex curve friction surface 8 on the inner face of sleeve 1. Apart from the curvature, the friction surfaces 8 are essentially slightly divergent in the direction toward end wall 3.

At the ends of the friction elements 6 facing an open end 9 of the sleeve 1, the friction elements are each provided with wedge surfaces 10 which have a convex curvature in the axial direction of sleeve 1. The wedge surfaces 10 are steeply inclined with respect to the axial direction of sleeve 1 adjacent the open end 9 of the sleeve and the curvature then approximates the axial direction of the sleeve in about the central portion of the friction elements 6. Opposing the wedge surfaces 10 are correspondingly curved wedge surfaces 11 on a regulator member 12. An intermediate element 13 is positioned between the wedge surfaces 10 and 11 and the length of the intermediate element is short as compared with the length of the wedge surfaces. The wedge surfaces 10 and 11 together with intermediate element 13 thus forms a force transmitting wedge system.

The side of regulator member 12 away from wedge surfaces 11 is supported against a thrust member 15 by means of a pretensioned spring 14. The load which is to be cushioned or absorbed by the spring element acts upon the thrust member 15 in the direction of arrow 16. The inner end of thrust member 15 is provided with an abutment 17 which retains the regulator member 12 in position against the force of compression spring 14. The abutment 17 also functions as a coupling between the thrust piece 15 and the intermediate elements 13 in a manner to be presently described. The intermediate elements 13 are guided so as to be radially displaceable with respect to thrust member 15 by means of a cage which is not illustrated in the drawings.

The components of the spring element are in the positions shown in FIG. 1 when no load is applied to the spring element. In the usual application, the sleeve 1 and thrust member 15 are attached to structures which are to be cushioned or resiliently supported with respect to each other but these structures are not illustrated. In another application the sleeve and thrust member can be mutually supported against each other in order to maintain the initial tension of spring 4.

When a force is applied in the direction of arrow 16 against thrust member 15 and is gradually increased, the regulator member 12 will be moved simultaneously to the right, as viewed in FIG. 1, together with thrust member 15 under the action of the pretensioned spring 14. The regulating member 12 thus clamps the intermediate elements 13 between opposed wedge surfaces 10 and 11. The thrust member 15 and regulator member 12 thus exert a force on the friction element 6 in the direction of arrows 18 by means of the intermediate elements 13. Since the forces represented by the arrows 18 are only slightly inclined with respect to the axial direction of sleeve 1, the friction elements 6 will be urged outwardly with a moderate force and pushed essentially to the right as viewed in FIG. 1. Because of the spreading apart or expansion of friction elements 6, the friction surfaces 7 are pressed with a moderate force on sleeve friction surfaces 8 so that only a moderate friction force must be overcome during the displacement of friction elements 6. The friction elements 6 also exert a force at the bearing areas 5 on the plate 4 and thus carry along the plate 2 so as to compress spring 4.

When the force applied to thrust member 15 is decreased, spring 4 will remain under tension because of friction elements 6 on friction surfaces 8 of the sleeve. Only after the load force on thrust member 15 has decreased below a certain value will the spring 4 displace the support plate 2 and friction elements 6 to the left as seen in FIG. 1. The regulator member 12 and thrust member 15 will also be moved to the left under the action of intermediate elements 13. Thus, as the load is removed from thrust member 15, all of the components of the spring element will return to the positions as shown in FIG. 1.

Should the load applied to thrust member 15 be applied suddenly or consist of a number of shocks or impacts in the direction of arrow 16 so that the load increases at a rapid rate, the thrust member 15 will be pushed to the right a certain distance but the regulator member 12 will remain in its initial position with respect to sleeve 1 for a short period of time because of its mass inertia. The abutment 17 will be released from engagement with regulator member 12 and the spring 14 will be compressed. During this action, the thrust member 15 will similarly displace the intermediate elements 13 to the right by means of the cage described above but not shown in the drawings. The intermediate elements 13 will thus be shifted on the wedge surfaces 10 to a portion of the wedge surfaces 10 which are only slightly inclined to the axial direction of the sleeve 1. After this displacement of the intermediate elements, the regulator member 12 will then be displaced to the right by spring 14 until its wedge surfaces 11 contact the intermediate elements 13 and clamp these elements in position between the wedge surfaces 10 and 11. This movement of regulator member 12 will cause this member to engage the abutment coupling 17. The spring element then operates in the manner as described above, namely, the friction elements 6 are now loaded in the direction of arrows 19 which are steeply inclined with respect to the axis of the sleeve 1. As a result, the friction elements 6 are now subjected to a stronger spreading apart in comparison with the magnitude of the load acting on thrust member 15. Thus, in order to displace the friction elements 6 with respect to sleeve 1, a friction force substantially higher than the slowly increased loading applied to thrust member 15 must be overcome. As previously described, the friction elements 6 are moved to the right to carry plate 2 to the right and thus compress spring 4.

When the load is removed from thrust member 15, plate 2, friction elements 6 and regulator member 12 and thrust member 15 are displaced to the left by spring 4 after a short delay during which the load decreases to a certain predetermined value. When the load is removed from thrust member 15, the intermediate elements 13 are free to move and upon the return of thrust member 15 and regulator member 12 to their initial positions the intermediate elements 13 are similarly displaced to the left by their cage to their original positions.

It is thus apparent that in response to the rate at which the load on thrust member 15 increases, the friction elements 6 are pressed against sleeve 1 with a force which increases as the rate of the load applied to thrust member 15 increases. The friction force which must be overcome during the inner spring action of the spring element varies in the same manner. Further, the ratio between the magnitude of the load on thrust member 15 and the friction force to be overcome increases with increasing spring action of the spring element because of the curvature of cooperating friction surfaces 7 and 8.

According to the present invention, the spring element of FIG. 1 can also be constructed so that the thrust member 15 is fixed and a load is applied against sleeve 1 in the direction of arrow 20. In this application, the spring element will still provide a friction force which varies with respect to the rate of increase of the load as described above. In a modification of the invention, the intermediate elements are not guided on thrust member 15 by a cage but are supported against plate 2 by means of springs 21 as indicated in FIG. 1 or against end wall 3 by springs which are not illustrated. The intermediate elements 13 will thus contact the thrust member 15 in the manner of an abutment coupling. This modification provides a spring element which has friction forces varying with the rate of the specific load increase both when the load is applied in the direction of arrow 16 and when the load is applied in the direction of arrow 20.

When the load is increased slowly in either of the directions of the arrows 16 and 20, the intermediate elements 13 will be clamped in such a relative position that only a low friction force need be overcome between friction elements 6 and sleeve 1. When the load increases rapidly as in the form of shocks, the intermediate elements 13 will be positioned in those portions of wedge surfaces 10 and 11 that are only slightly inclined with respect to the axial direction of sleeve 1. The operation of the spring element when thrust member 15 is loaded in shocks has been described above. When shock loading occurs in the direction of arrow 20 against sleeve 1, plate 2 and friction elements 6 will be initially moved to the left under the action of pretensioned spring 4. The intermediate elements 13 will remain in their initial positions because of their mass inertia within the scope of their play between wedge surfaces 10 and 11. The springs 21 will be compressed. Only after this play between wedge surfaces 10 and 11 is overcome will the intermediate elements be clamped firmly in a portion of the wedge surfaces 10 of friction elements 6 which is slightly inclined to the axial direction of sleeve 1. Upon further increase of the load on sleeve 1 in the direction of arrow 20, sleeve 1 will be moved to the left as seen in FIG. 1 to compress spring 4 while thrust member 15 and regulator member 12 will remain in position. Accordingly, a friction force will be generated between pressure surfaces 7 and friction surfaces 8 which will vary in accordance with the spreading of friction elements 6 under the action of the force transmitting wedge system 10, 11, 13. This will also be in response to the specific position of intermediate elements 13 between wedge surfaces 10 and 11.

In the above described embodiment, the intermediate elements 13 which delay in movement from their original positions against the force of springs 21 so as not to be displaced when sleeve 1 is subjected to shock loads in the direction of arrow 20 remains in its original position because of its inertia but its mass is relatively small. The mass of these intermediate elements 13 can be increased by the modification illustrated in FIG. 2 wherein the intermediate elements are connected by traction members 22 to a second regulator member 23 whose mass is considerably greater than that of the intermediate elements. The second regulator 23 is positioned between the regulator member 12 and support plate 2 and is supported against plate 2 in the direction of displacement toward this plate by means of a compression spring 24 and is retained in the opposite direction against support plate 2 by abutments 25. The remaining structure of the modification of FIG. 2 is similar to that of FIG. 1.

When shock-type loads are applied to the sleeve 1 in the direction of arrow 20 to displace initially sleeve 1 and support plate 2 to the left, intermediate elements 13 will remain in position because of its increased mass resulting from the connection of second regulator member 23 to the intermediate elements. During this period the spring 24 will be compressed. Thus, the regulator member 23 increases the inertia mass of the intermediate elements 13 during this phase of operation of the spring element so that the desired displacement of the components is obtained. In all other respects, the operation of the spring element of FIG. 2 corresponds to that of the spring element of FIG. 1.

It is to be noted that in the embodiment and modifications as described above, the intermediate elements 13 can be displaced only within the limits of their play between wedge surfaces 10 and 11 when shock loads are applied to the spring element in the direction of arrow 20. As a result, the intermediate elements 13 will not shift in the axial direction of sleeve 1 while the friction elements 6 having wedge surfaces 10 thereon are shifted to the left as described previously. Thus, the displacement range of the intermediate elements 13 is relatively limited. In order to increase the range of displacement for the intermediate elements the position of the intermediate elements between wedge surfaces 10 and 11 can be controlled by a transmission system responsive to shifting of the regulator member 12 with respect to thrust member 15 or of the second regulator member 23 with respect to plate 2 or in response to the friction elements 6. Such a transmission system is indicated in FIG. 2 by the dashed lines and essentially comprises an angle or crank lever 26 pivotally mounted in the central section of one of the friction elements 6. One end of crank lever 26 defines an abutment coupling 27 which contacts the side of regulator member 23 directed to compression spring 24 and its other end forms an abutment coupling 28 to contact intermediate element 13. When a relative displacement of regulator member 23 occurs with respect to friction elements 6 as happens initially in connection with the shock loading applied in the direction of arrow 20 on sleeve 1, the crank lever 26 will pivot and thus displace intermediate element 13 to the right. The magnitude of the displacement of intermediate element 23 will be a function of the transmission effect of the crank lever 26. A large path of displacement can be obtained by a suitable selection of its pivot mount and curvature of the leg which forms a portion of abutment coupling 28. In this respect, a point of contact on intermediate element 13 will slide along on the leg of the crank lever.

Thus it can be seen that the present invention has disclosed a spring element wherein its thrust member is coupled by means of an abutment coupling to the intermediate element in its direction of displacement toward that portion of the wedge surfaces which extends slightly inclined with respect to the axial direction of the sleeve or direction of insertion of the thrust member. A regulator member carrying one of the coupling surfaces of a force transmitting wedge surface system is supported in the thrust member by means of a pretensioned spring and an abutment is provided on the thrust member to retain the regulator member against the force of the spring. The intermediate element is provided with a clearance between the wedge surfaces when the spring element is not subjected to a load and the intermediate element is supported by a spring in the direction of insertion against the sleeve or a part coupled to the sleeve against the direction of insertion of the thrust member.

As a modification, the intermediate element can be coupled to a second regulating member by traction members. The second regulating member is displaced with respect to the intermediate element in the direction of insertion and is supported against the sleeve or against a part coupled to the sleeve against the direction of insertion by means of a pretensioned spring.

The spring element as disclosed herein thus provides for relatively high spring and friction forces during the initial application of a load with these forces gradually decreasing with respect to the application of the load.

It will be understood that this invention is susceptible to modification in order to adapt it to different usages and conditions, and accordingly, it is desired to comprehend such modifications within this invention as may fall within the scope of the appended claims.

What is claimed is:

1. A spring element particularly adapted for automatic center head couplers of railroad vehicles comprising a sleeve having a friction surface on the inner face thereof and spring means generating spring forces, curved friction element means within said sleeve movable upon said sleeve friction surface to generate friction forces, a thrust member insertable in an axial direction into said sleeve and acting against said spring and friction forces therein, force transmitting wedge means coupling said thrust member and said curved friction element means so that said friction element means is carried along by said thrust member upon its insertion into the sleeve, said force transmitting wedge means comprising opposed cooperating curved wedge surfaces extending in the direction of insertion of said thrust member, an intermediate element between said curved wedge surfaces and engageable therewith and having a length which is short with respect to the length of the wedge surfaces, and regulator means responsive to the magnitude of shock loads acting on the spring element for positioning said intermediate member on a steeply inclined portion of said wedge surfaces for low shock loads and on a slightly inclined portion for high shock loads.

2. A spring element as claimed in claim 1 wherein said regulator means comprises a regulator member spring supported in the direction of shock load, the position of said regulator member being determined by the position of said intermediate element with respect to said wedge surfaces.

3. A spring element as claimed in claim 2 wherein said wedge surfaces have a convex curvature with respect to said friction element means, said regulator means positioning said intermediate element in a portion of the wedge surfaces which is steeply inclined with respect to the direction of insertion when the magnitude of the shock load is low and in a portion of said wedge surfaces which is slightly inclined when the magnitude of the shock load is high.

4. A spring element as claimed in claim 3 wherein said wedge surfaces are slightly inclined in the direction of insertion, said thrust member having an abutment for coupling with said intermediate element in the direction of displacement toward said wedge surfaces, and a pretensioned spring supporting said regulator member within said thrust member in the direction of insertion, said abutment on said thrust member retaining said regulator member against said spring.

5. A spring element as claimed in claim 4 wherein said intermediate element is positioned with play between said wedge surfaces when the spring element is not subjected to a load, and a spring supporting said intermediate element in the direction of insertion of the thrust member.

6. A spring element as claimed in claim 4 and comprising a second regulator member positioned for displacement in the direction of insertion with respect to said intermediate member, a plurality of traction members connecting said second regulator member to said intermediate element, and a second pretensioned spring supporting said second regulator member against the direction of insertion.

* * * * *